(12) United States Patent
Wang et al.

(10) Patent No.: US 8,437,919 B2
(45) Date of Patent: May 7, 2013

(54) VEHICLE PERSONALIZATION SYSTEM

(75) Inventors: Jenne-Tai Wang, Rochester, MI (US);
Dorel M. Sala, Troy, MI (US); Mark O. Neal, Rochester, MI (US); Chin-Hsu Lin, Troy, MI (US); Bing Deng, Rochester Hills, MI (US); Martin Andrew Hogan, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1271 days.

(21) Appl. No.: 12/044,156

(22) Filed: Mar. 7, 2008

(65) Prior Publication Data

US 2008/0228358 A1    Sep. 18, 2008

Related U.S. Application Data

(60) Provisional application No. 60/894,544, filed on Mar. 13, 2007.

(51) Int. Cl.
*G05D 1/00* (2006.01)
*G06F 7/00* (2006.01)

(52) U.S. Cl.
USPC .............. 701/49; 701/1; 701/45; 701/99

(58) Field of Classification Search .............. None
See application file for complete search history.

(56) References Cited

U.S. PATENT DOCUMENTS

| | | | | |
|---|---|---|---|---|
| 4,853,687 A | | 8/1989 | Isomura et al. | |
| 5,155,685 A | * | 10/1992 | Kishi et al. | 701/49 |
| 5,187,665 A | * | 2/1993 | Futami et al. | 701/49 |
| 5,694,320 A | * | 12/1997 | Breed | 701/45 |
| 5,722,686 A | * | 3/1998 | Blackburn et al. | 280/735 |
| 5,835,873 A | * | 11/1998 | Darby et al. | 701/45 |
| 5,900,677 A | * | 5/1999 | Musiol et al. | 307/10.1 |
| 6,131,060 A | * | 10/2000 | Obradovich et al. | 701/49 |
| 6,134,492 A | * | 10/2000 | Breed et al. | 701/49 |
| 6,158,768 A | * | 12/2000 | Steffens et al. | 280/735 |
| 6,199,900 B1 | * | 3/2001 | Zeigler | 280/735 |
| 6,331,014 B1 | * | 12/2001 | Breed | 280/730.1 |
| 6,422,087 B1 | * | 7/2002 | Potter | 73/731 |
| 6,590,354 B2 | * | 7/2003 | Hein | 318/34 |
| 6,609,053 B1 | * | 8/2003 | Breed | 701/45 |
| 6,615,123 B2 | * | 9/2003 | Morehouse | 701/49 |
| 6,746,049 B2 | * | 6/2004 | Pavlov et al. | 280/803 |
| 6,757,602 B2 | * | 6/2004 | Breed et al. | 701/45 |
| 6,816,766 B2 | | 11/2004 | Sala et al. | |
| 6,836,754 B2 | | 12/2004 | Cooper | |
| 6,950,022 B2 | * | 9/2005 | Breed | 340/552 |
| 7,055,639 B2 | * | 6/2006 | Kiribayashi | 180/271 |

(Continued)

FOREIGN PATENT DOCUMENTS

CN    1647098 A    7/2005

*Primary Examiner* — Ian Jen
(74) *Attorney, Agent, or Firm* — Quinn Law Group, PLLC (57) ABSTRACT

A vehicle includes at least one reconfigurable system having a plurality of selectively variable parameters, and a controller that is operatively connected to the at least one reconfigurable system to control the values of the plurality of selectively variable parameters. The controller is also configured to receive data indicative of physical characteristics of a person from at least one data storage medium, and configured to determine values of the selectively variable parameters according to a predetermined algorithm based on the data indicative of physical characteristics of a person. The controller is also configured to cause the selectively variable parameters to assume the determined values.

15 Claims, 6 Drawing Sheets

U.S. PATENT DOCUMENTS

| | | | |
|---|---|---|---|
| 7,111,808 B2 * | 9/2006 | Sprenger | 244/118.5 |
| 7,134,688 B2 * | 11/2006 | Takagi et al. | 280/735 |
| 7,151,452 B2 * | 12/2006 | Shieh | 340/561 |
| 7,236,865 B2 | 6/2007 | Prakah-Asante et al. | |
| 7,283,901 B2 | 10/2007 | Luo et al. | |
| 8,126,616 B2 * | 2/2012 | Phipps et al. | 701/49 |
| 2002/0120379 A1 * | 8/2002 | Oestreicher et al. | 701/45 |
| 2002/0125050 A1 * | 9/2002 | Breed et al. | 177/136 |
| 2002/0183910 A1 * | 12/2002 | Gillis | 701/45 |
| 2002/0188393 A1 * | 12/2002 | Yokota et al. | 701/45 |
| 2003/0036835 A1 * | 2/2003 | Breed et al. | 701/45 |
| 2003/0152088 A1 | 8/2003 | Kominami et al. | |
| 2004/0078127 A1 * | 4/2004 | Johnson et al. | 701/45 |
| 2004/0232674 A1 * | 11/2004 | Winkler et al. | 280/735 |
| 2005/0154516 A1 * | 7/2005 | Dirand et al. | 701/45 |
| 2005/0209755 A1 * | 9/2005 | Sugiura | 701/45 |
| 2005/0218633 A1 * | 10/2005 | Levine | 280/730.1 |
| 2006/0069509 A1 * | 3/2006 | Hayasaka | 701/301 |
| 2006/0103193 A1 * | 5/2006 | Kramer | 297/217.3 |
| 2006/0217862 A1 * | 9/2006 | Sakai et al. | 701/45 |
| 2006/0226641 A1 * | 10/2006 | Watts | 280/735 |
| 2006/0267321 A1 * | 11/2006 | Harish et al. | 280/735 |
| 2006/0283652 A1 * | 12/2006 | Yanai et al. | 180/272 |
| 2006/0290117 A1 * | 12/2006 | Fischer et al. | 280/739 |
| 2007/0012502 A1 * | 1/2007 | Molitor et al. | 180/273 |
| 2007/0035114 A1 * | 2/2007 | Breed et al. | 280/735 |

* cited by examiner

FIG. 1

| SELECTIVE SUBSYSTEMS/ FEATURES | CONTROL PARAMETERS | USER CONTROLLABLE PARAMETERS (UCP) |
|---|---|---|
| DOOR LOCKS | LOCK/UNLOCK | YES |
| REAR VISION SYSTEM | ANGLES OF SIDE MIRROR AND INTERIOR MIRROR | YES |
| CLIMATE CONTROL SYSTEM | OPERATING MODE, TEMPERATURE SETTING | YES |
| RADIO | STATION PRESETTING | YES |
| CHASSIS CONTROL | SUSPENSION MODE (FIRM, NORMAL, SOFT) | YES |
| HEADS UP DISPLAY | DISPLAY SCREEN POSITION | YES |
| SEAT | POSITION, ELEVATION, CUSHION, AND BACK ANGLE | YES |
| HEADREST | HEIGHT, ANGLE | YES |
| SEATBELTS | BELTED OR UNBELTED | YES |
| SEAT BELT ADJUSTABLE GUIDE LOOP/HEIGHT ADJUSTER | GUIDE LOOP HEIGHT | YES |
| SEAT BELT PRE-TENSIONER/ PRE-TIGHTENER | PRE-TENSIONING FORCE LEVEL | YES |
| SEAT BELT LOAD LIMITER | LOAD LIMITING FORCE LEVEL | YES |
| SEAT BELT BUCKLE | BUCKLE ANGLE | YES |
| MOTORIZED SEAT BELT | PRE-TIGHTENER FORCE PROFILE/ LEVEL | YES |
| STEERING WHEEL AND COLUMN | POSITION, ANGLE, BUILT-LOAD | YES (POSITION, ANGLES), NO (BUILT LOAD) |
| ADJUSTABLE PEDALS | POSITION | YES |
| ACTIVE KNEE BOLSTERS | POSITION, IMPACT, ENERGY ABSORPTION (EA) FORCE LEVEL ANGLE | NO |
| IMPACT SENSING SYSTEM | ON/OFF, DEPLOYMENT LEVEL/STAGE | NO |
| DRIVER AIRBAG | VENT SIZE, INFLATOR OUTPUT (E.G., 1 STAGE, 2 STAGES) | NO |
| PASSENGER AIRBAG | VENT SIZE, INFLATOR OUTPUT (E.G., 1 STAGE, 2 STAGES) | NO |
| KNEE AIRBAGS | VENT SIZE, INFLATOR OUTPUT (E.G., 1 STAGE, 2 STAGES) | NO |
| SIDE AIRBAGS | VENT SIZE, INFLATOR OUTPUT (E.G., 1 STAGE, 2 STAGES) | NO |
| FAR-SIDE AIRBAGS | VENT SIZE, INFLATOR OUTPUT (E.G., 1 STAGE, 2 STAGES) | NO |
| CURTAIN AIRBAGS | VENT SIZE, INFLATOR OUTPUT (E.G., 1 STAGE, 2 STAGES) | NO |
| TELEMATICS | AUTOMATIC MAYDAY SIGNAL (E.G., REPORTING LOCATION, TYPE & SEVERITY OF THE IMPACT, NUMBER OF OCCUPANTS INVOLVED, SPECIAL MEDICAL INFORMATION OF INDIVIDUAL OCCUPANTS, ETC.) | NO |
| PRE-IMPACT SENSING SYSTEM | IMPACT RISK PREDICTION (E.G., RANGE, RANGE RATE, IMPACT DIRECTION, TIME TO IMPACT, IMPACT OBJECT INFO., ETC.) | NO |
| VEHICLE TO VEHICLE COMMUNICATION SYSTEM | IMPACT RISK PREDICTION (E.G., RANGE, RANGE RATE, IMPACT DIRECTION, TIME TO IMPACT, IMPACT OBJECT INFO., ETC.) | NO |
| INFRASTRUCTURE TO VEHICLE COMMUNICATION SYSTEM | IMPACT RISK PREDICTION (E.G., RANGE, RANGE RATE, IMPACT DIRECTION, TIME TO IMPACT, IMPACT OBJECT INFO., ETC.) | NO |
| OCCUPANT SENSING & IDENTIFICATION SYSTEM | OCCUPANT HEIGHT, SEATING HEIGHT, WEIGHT, AGE GROUP, GENDER, ETC. | NO |

FIG. 2

| OCCUPANT | PHYSICAL CHARACTERISTICS | PERSONAL PREFERENCE |
|---|---|---|
| DRIVER | HEIGHT, SEATING HEIGHT, WEIGHT, CHEST/WAIST/HIP MEASUREMENTS, AGE OR AGE GROUP, GENDER, BLOOD TYPE, SPECIAL MEDICAL CONDITION | SEAT ELEVATION (HIGH, MEDIUM OR LOW), SEAT BACK ANGLE (LARGE, MEDIUM, SMALL), CLIMATE CONTROL (HIGH, MEDIUM, LOW), REAR VISION SYSTEM ADJUSTMENT (USER'S PREFERRED METHOD, BLIND ZONE METHOD OR B/G ELIMINATION METHOD), RADIO STATION PRESETTING, SUSPENSION MODE (FIRM, NORMAL, SOFT), HUD CONTENT AND LAYOUT |
| FRONT SEAT PASSENGERS | HEIGHT, SEATING HEIGHT, WEIGHT, CHEST/WAIST/HIP MEASUREMENTS, AGE OR AGE GROUP, GENDER, BLOOD TYPE, SPECIAL MEDICAL CONDITION | SEAT ELEVATION (HIGH, MEDIUM OR LOW), SEAT BACK ANGLE (LARGE, MEDIUM, SMALL), CLIMATE CONTROL (HIGH, MEDIUM, LOW) |
| REAR SEAT PASSENGERS | HEIGHT, SEATING HEIGHT, WEIGHT, CHEST/WAIST/HIP MEASUREMENTS, AGE OR AGE GROUP, GENDER, BLOOD TYPE, SPECIAL MEDICAL CONDITION | SEAT ELEVATION (HIGH, MEDIUM OR LOW), SEAT BACK ANGLE (LARGE, MEDIUM, SMALL), CLIMATE CONTROL (HIGH, MEDIUM, LOW) |
| FRONT SEAT CHILDREN | HEIGHT, SEATING HEIGHT, WEIGHT, AGE OR AGE GROUP, GENDER, CHILD RESTRAINT TYPE, BLOOD TYPE, SPECIAL MEDICAL CONDITION | |
| FRONT SEAT CHILDREN | HEIGHT, SEATING HEIGHT, WEIGHT, AGE OR AGE GROUP, GENDER, CHILD RESTRAINT TYPE, BLOOD TYPE, SPECIAL MEDICAL CONDITION | |

| OCCUPANT-TO-VEHICLE COMMUNICATION (USER INTERFACE) OPTIONS | PERSONAL PROFILE AND PREFERENCE DATA ESTABLISHED THROUGH / BY / AT | PERSONAL PROFILE AND PREFERENCE DATA STORED IN | USER VERIFICATION | "YOUR CAR IS MY CAR" CAPABILITY |
| --- | --- | --- | --- | --- |
| VOICE RECOGNITION SYSTEM WITH KEYPAD FOR PASSWORD OR PIN NUMBER | INDIVIDUAL USER | VEHICLE | WITH | YES |
| VOICE RECOGNITION SYSTEM WITH KEYPAD FOR PASSWORD OR PIN NUMBER | CAR DEALER | VEHICLE | WITH | NO |
| TELEMATIC SYSTEM + KEYPAD FOR PASSWORD OR PIN NUMBER | INDIVIDUAL USER | REMOTE DATABASE | WITH | YES |
| KEY PAD (PIN NUMBER) | CAR DEALER | VEHICLE | WITH | NO |
| KEY PAD AND DISPLAY + PASSWORD OR PIN NUMBER | INDIVIDUAL USER | VEHICLE | WITH | YES |
| CARD READER | CAR DEALER | CARD | WITHOUT | YES |
| CARD READER + ID DISPLAY | CAR DEALER | CARD | QUASI | YES |
| CARD READER + KEY PAD OR VOICE RECOGNITION SYSTEM (FOR PASSWORD OR PIN NUMBER) | CAR DEALER | CARD | WITH | YES |
| CARD READER + OCCUPANT IDENTIFICATION SYSTEM (SENSORS) | CAR DEALER | CARD | WITH | YES |
| BIO-IDENTIFIER | CAR DEALER | VEHICLE | WITH | YES |
| BIO-IDENTIFIER + ONSTAR-LIKE SYSTEM | INDIVIDUAL USER AND/OR CAR DEALER | VEHICLE OR REMOTE DATABASE | WITH | YES |
| RF ID | CAR DEALER | VEHICLE OR REMOTE DATABASE | WITHOUT | YES |
| RF ID WITH OCCUPANT VERIFICATION SYSTEM | CAR DEALER | VEHICLE OR REMOTE DATABASE | WITH | YES |

Fig. 7

VEHICLE PERSONALIZATION SYSTEM

CROSS REFERENCE TO RELATED APPLICATION

This application claims the benefit of U.S. Provisional Application No. 60/894,544, filed Mar. 13, 2007, and which is hereby incorporated by reference in its entirety.

TECHNICAL FIELD

This invention relates to systems that retrieve biometric information from a prerecorded storage medium and reconfigure vehicle systems based on the biometric information.

BACKGROUND OF THE INVENTION

The physical characteristics and personal preferences of vehicle passengers vary widely. Accordingly, vehicles are designed to allow persons of varying sizes and preferences to adjust select features of vehicle systems for each person's comfort, convenience, and operation needs. For example, vehicle seats, foot pedals, rearview mirrors, steering columns, etc. are adjustable by an occupant to accommodate the occupant's height, weight, etc.

To reduce the burden of re-adjusting the select features of a vehicle for its frequent users, some vehicles include a memory system that stores the preferred settings of multiple users, and that is configured to automatically adjust the vehicle systems to the preferred settings upon request by one of the users. Features with memory are sometimes referred to as personalized features and/or systems.

SUMMARY OF THE INVENTION

A vehicle includes a seat assembly for supporting an occupant; at least one reconfigurable system mounted with respect to the seat assembly and having a plurality of selectively variable parameters; and a controller. The controller is operatively connected to the reconfigurable system to control the values of the selectively variable parameters, configured to receive data indicative of physical characteristics of a person from at least one data storage medium, configured to determine values of the selectively variable parameters according to a predetermined algorithm based on the data indicative of physical characteristics of a person, and configured to cause the selectively variable parameters to assume the determined values.

Accordingly, the vehicle may automatically adjust the reconfigurable system based on unique characteristics of an occupant, and in accordance with preferred values determined by an algorithm.

A corresponding method of personalizing a vehicle having reconfigurable systems characterized by selectively variable parameters is provided. The method includes receiving data indicating physical characteristics of a person from a data storage medium; determining values for the selectively variable parameters based on the data indicating physical characteristics in accordance with a predetermined algorithm; and causing the selectively variable parameters to assume the determined values.

A method of compiling data is also provided. The method includes obtaining personal information of each of a plurality of persons. The personal information includes physical characteristics of the plurality of persons. The method further includes recording a plurality of data sets in a storage medium accessible by a controller in a vehicle. Each of the data sets contain the personal information of a respective one of the persons.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a table depicting exemplary reconfigurable systems and selectively variable parameters thereof;

DESCRIPTION OF THE PREFERRED EMBODIMENTS

Figure 1:
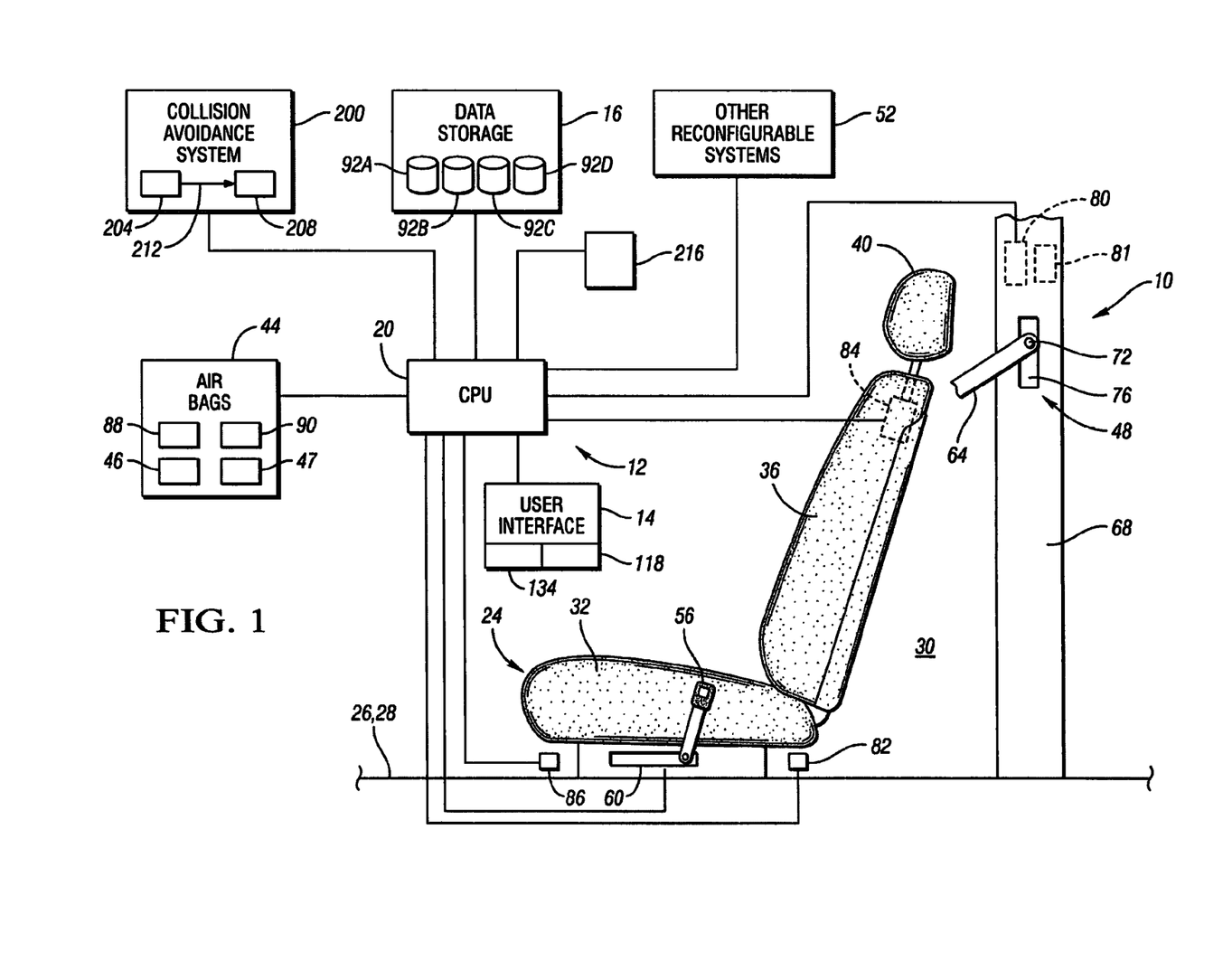
FIG. 1 is a schematic depicted of a vehicle including a personalization system and reconfigurable systems including a seat assembly.

Referring to FIG. 1, a vehicle 10 includes a vehicle personalization system 12. The vehicle customization system 12 in the embodiment depicted includes a user interface 14, a data storage and retrieval module 16, and a central processing unit (CPU) 20, also sometimes referred to herein as a "controller." A "controller" may include one or more controllers that cooperate to perform the logical operations described herein. The vehicle 10 also includes a seat assembly 24 mounted to the floor 26 of a vehicle body 28. The floor 26 cooperates with other portions of the body 28 to define a passenger compartment 30. The seat assembly 24 is located within the passenger compartment 30 and is configured to support a human occupant, as understood by those skilled in the art.

The seat assembly 24 includes a lower seat portion 32, a seatback portion 36 that is pivotably mounted with respect to the lower seat portion 32, and a headrest 40 that is movably mounted to the seatback portion 36. The vehicle 10 also includes a plurality of reconfigurable systems, including the seat assembly 24, one or more airbags 44 associated with the seat assembly 24, a seat belt system 48 associated with the seat assembly 24, and a plurality of other reconfigurable systems 52.

The reconfigurable systems 24, 44, 48, 52 are characterized by selectively variable parameters, or characteristics. The selectively variable parameters of the seat assembly 24 include the height of the lower seat portion 32 with respect to the floor 26, the fore/aft position of the lower seat portion with respect to the body 28, the reclination angles of the lower seat portion 32 and the seatback portion 36 with respect to horizontal or vertical, the height of the headrest portion 40 with respect to the seatback portion 36, etc. The airbags 44 may include one or more of a frontal airbag, a knee airbag, a side airbag, and a curtain airbag. The selectively variable parameters of the airbags 44 include the size of the airbag vent 46 and the output of the inflator 47 (e.g., one stage vs. two stages).

The seat belt system 48 includes a buckle 56 mounted with respect to the lower seat portion 32 via a pretensioner and load-limiter 60. The seat belt system 48 also includes a webbing 64 mounted with respect to the seat assembly 24; in the embodiment depicted, the webbing 64 is movably coupled to a B-pillar 68 by member 72 and track 76. Member 72 is operatively connected to the webbing 64, and the track 76 is mounted with respect to the B-pillar 68. The member 72 is engaged with the track 76 for selective movement up and down along the track 76. An actuator 80, such as a servomotor, is operatively connected to the member 72 to selectively move the member 72 up and down with respect to the B-pillar 68. Selectively variable parameters of the seat belt system 48 include the position of the member 72 on the track 76, the pretensioning force level and rate provided by the pretensioner and load-limiter 60, and the load limiting force level provided by the pretensioner and load-limiter 60. Feedback sensor 81 monitors the position of the member 72 and transmits the position of the member 72 to the CPU 20.

The vehicle 10 also includes other reconfigurable systems 52 that are operatively connected to the CPU 20 to be controlled thereby, such as a climate control system, an audio system, foot pedals, etc. Exemplary reconfigurable systems that may be employed within the vehicle 10 and controlled by the CPU are shown in the table of FIG. 2. Referring to FIG. 2, the left column lists exemplary reconfigurable systems that may be employed within the scope of the disclosure, the center column lists exemplary parameters of the reconfigurable systems that are selectively variable, and the right column discloses whether the parameters are variable, or adjustable, by a user or occupant of the vehicle 10.

Referring again to FIG. 1, the reconfigurable systems include actuators to vary or adjust the values of the selectively variable parameters. The actuators are controllable by the CPU 20 such that the values of the parameters are controllable by the CPU 20. The reconfigurable systems also include feedback sensors configured to monitor the values of the parameters and to communicate the values to the CPU 20. More specifically, actuators 82, which may, for example, be servomotors, are operatively connected to the seat assembly 24 to selectively move the lower seat portion 32 fore and aft, and up and down, as well as to tilt the lower seat portion 32, i.e., adjust the reclination angle. Servomotors 82 are also operatively connected to the seatback portion 36 to pivot the seatback portion 36, i.e., to adjust the reclination angle. An actuator 84 is also operatively connected to the headrest 40 to selectively raise and lower the headrest 40, and to move the headrest fore/aft relative to the seatback portion 36.

The CPU 20 is operatively connected to actuators 82, 84 to control values of the selectively variable parameters of the seat assembly 24. Feedback sensors 86 are configured to monitor the positions of the lower seat portion 32, the seatback portion 36, and the headrest 40, and are operatively connected to the CPU 20 to communicate the positions of the lower seat portion 32, the seatback portion 36, and the headrest 40 to the CPU 20.

Similarly, each airbag 44 has at least one actuator 88 operatively connected to the CPU 20 to be controlled thereby, and configured to adjust the vent size or the inflator output. Each airbag 44 also includes at least one sensor 90 that is configured to monitor the size of the vent, etc., and that is operatively connected to the CPU 20 to communicate the size of the vent thereto.

The personalization system 12 is configured to cause the selectively variable parameters of the reconfigurable systems 24, 44, 48, 52 to assume values that are determined by the CPU 20 according to a predetermined algorithm and based on personal information about the occupant of the seat assembly 24. The personal information is prerecorded onto a data storage medium. In the embodiment of FIG. 1, the personal information is stored in the data storage and retrieval module 16.

Figure 3:
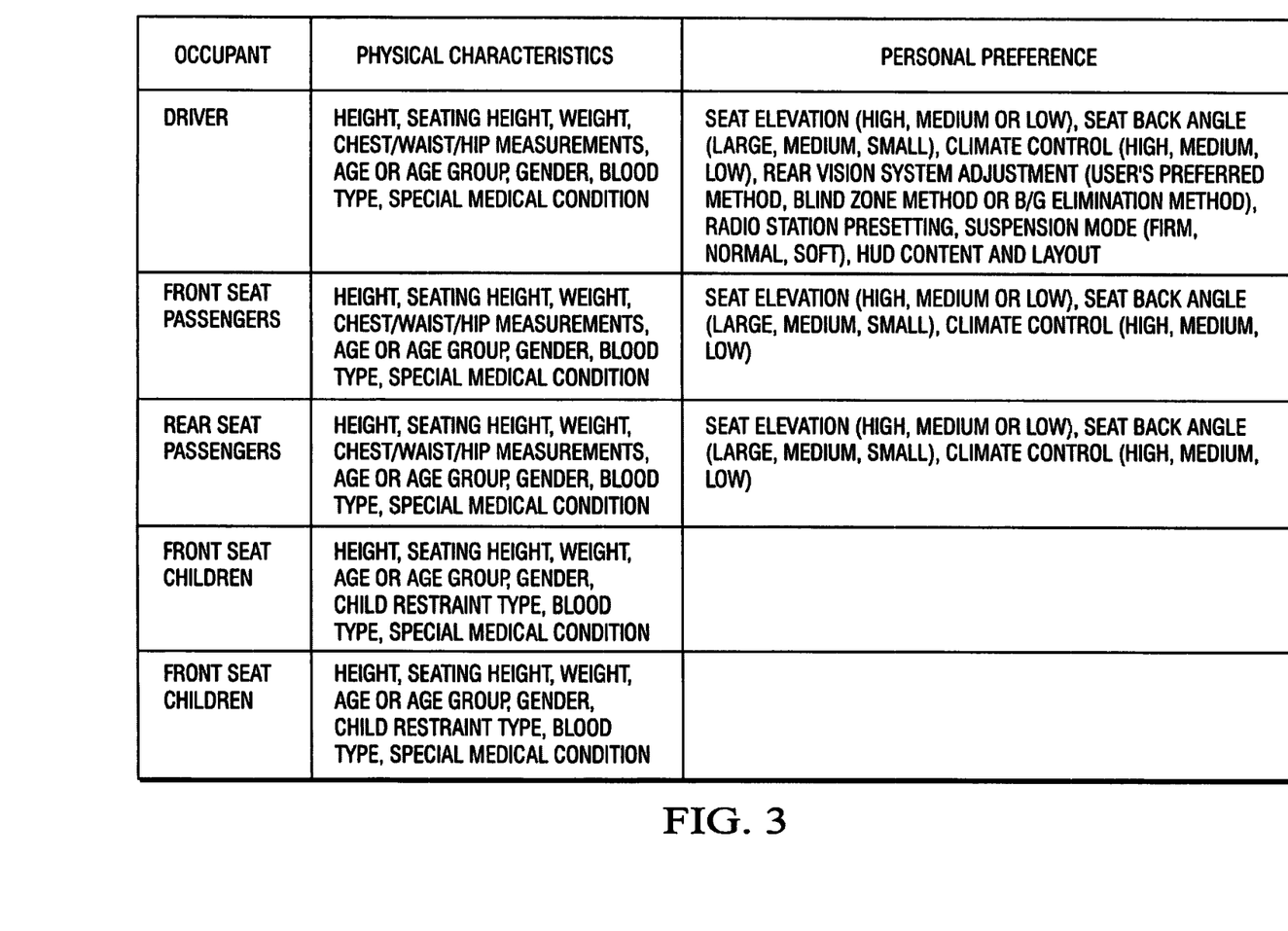
FIG. 3 is a table depicting exemplary information stored in a storage medium of the personalization system.

More specifically, the data storage and retrieval module 16 stores a plurality of data sets 92A, 92B, 92C, 92D. Each data set 92A, 92B, 92C, 92D contains personal information for a respective person. The personal information for each person includes physical characteristics and personal preferences. Exemplary personal information stored in the data sets 92A-D is depicted in FIG. 3. Referring to FIG. 3, the left column indicates different occupant types, depending on the age of the occupant and the position of the seat assembly 24 within the vehicle 10. Seat assembly 24 may be a driver's seat, a front passenger seat, or a rear seat within the scope of the disclosure. The center column indicates exemplary physical characteristics for each occupant type that may be included in the personal information stored in the data sets 92A, 92B, 92C, 92D. The right column indicates exemplary personal preferences for each occupant type that may be included in the personal information stored in the data sets 92A, 92B, 92C, 92D.

Figure 4:
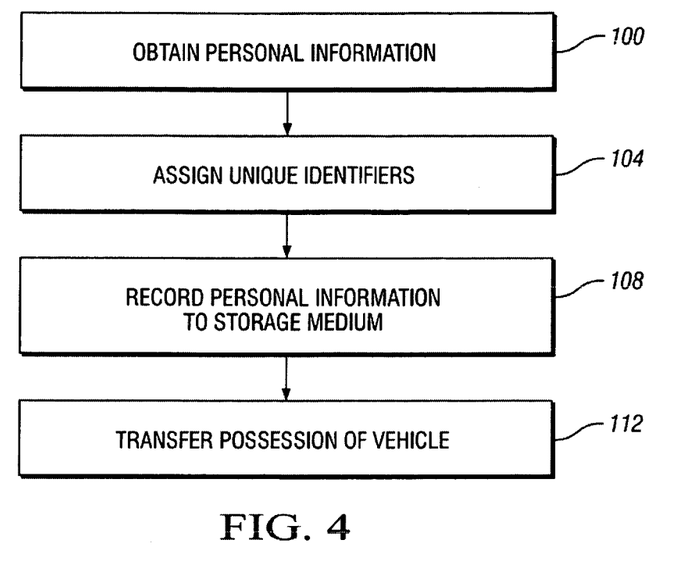
FIG. 4 is a flow chart depicting a method of obtaining the information stored in the storage medium of the personalization system.
Figure 5:
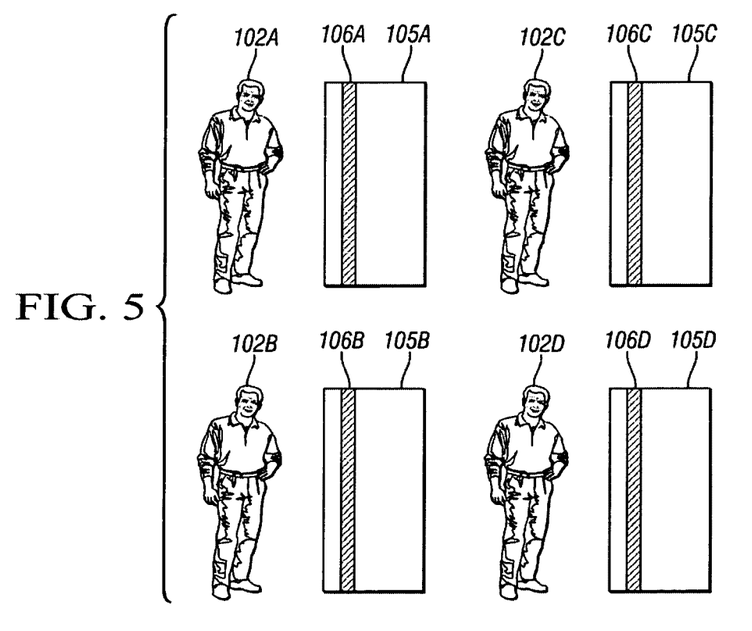
FIG. 5 is a schematic depiction of potential occupants of the seat assembly.

FIG. 4 depicts a method of obtaining the data sets 92A, 92B, 92C, 92D. The method may, for example, be performed by an automobile dealer for a customer purchasing a vehicle. Referring to FIGS. 4 and 5, the method includes, at step 100, obtaining personal information of a plurality of persons (shown at 102A, 102B, 102C, 102D in FIG. 5). Exemplary persons include the customer and the customer's family and friends. The personal information includes physical characteristics (biometric data) and personal preferences. The personal information may be obtained by direct measurement of the persons, or may be communicated by the persons. The physical characteristics may include, for example, weight, height, length of torso, length of legs, etc.

The personal information in the embodiment depicted includes verification information that is unique, i.e., none of the data sets 92A-D contain verification information identical to another of the data sets 92A-D. The verification information may, for example, be a biometric identifier of the person 102A-D, or may be assigned or selected, such as a personal identification number or alphanumeric password. Biometric identifiers include physiological characteristics of the occupants, such as facial characteristics, fingerprints, hand geometry, iris characteristics, retinal characteristics, voice, etc. Biometric identifiers also include behavior characteristics.

The persons 102A, 102B, 102C, 102D may include the individuals that the customer expects to be passengers in the vehicle that the customer is purchasing. It should be noted that, as used herein, "purchasing" a vehicle refers to obtaining possession of a vehicle, and may include purchasing, leasing, etc. The data collected at step 100 may include any and all of the information described in FIG. 3.

The method further includes assigning to each person 102A, 102B, 102C, 102D a respective unique identifier, i.e., unique identification data (step 104). A unique identifier may, for example, be a string of alphanumeric characters. Step 104 may also include, for each person, preparing a respective personal identification medium 105A, 105B, 105C, 105D that stores the unique identifier of that person. Thus, medium 105A stores the unique identifier of person 102A; medium 105B stores the unique identifier of person 102B; medium 105C stores the unique identifier of person 102C; and medium 105D stores the unique identifier of person 102D. In one embodiment, the personal identification media 105A-D are plastic cards, each of which includes a respective magnetic strip 106A-D that stores the unique identification data for a respective one of the persons 102A-D. Personal identification media may also include, for example, programmable read only memory (ROM), other magnetic media such as a floppy disk, optical media such as a compact disk or digital video disk (DVD), radio frequency identification (RFID) tags, etc., within the scope of the claimed invention.

The method also includes, for each person for which personal information was obtained in step 100, storing the personal information as a respective data set 92A, 92B, 92C, 92D in the data storage and retrieval module 16 (step 108). Each data set 92A-D is stored such that it is associated with the unique identifier of the person whose personal information is stored therein. Accordingly, the data sets are searchable and retrievable using the unique identifier associated therewith. Thus, data set 92A contains the personal information of person 102A and is retrievable from the module 16 using the unique identifier of person 92A; data set 92B contains the personal information of person 102B and is retrievable from the module 16 using the unique identifier of person 92B; data set 92C contains the personal information of person 102C and is retrievable from the module 16 using the unique identifier of person 92C; and data set 92D contains the personal information of person 102D and is retrievable from the module 16 using the unique identifier of person 92D. The method also includes granting possession of a vehicle to the customer and granting possession of the personal identification media to the customer (step 112).

Figure 6:
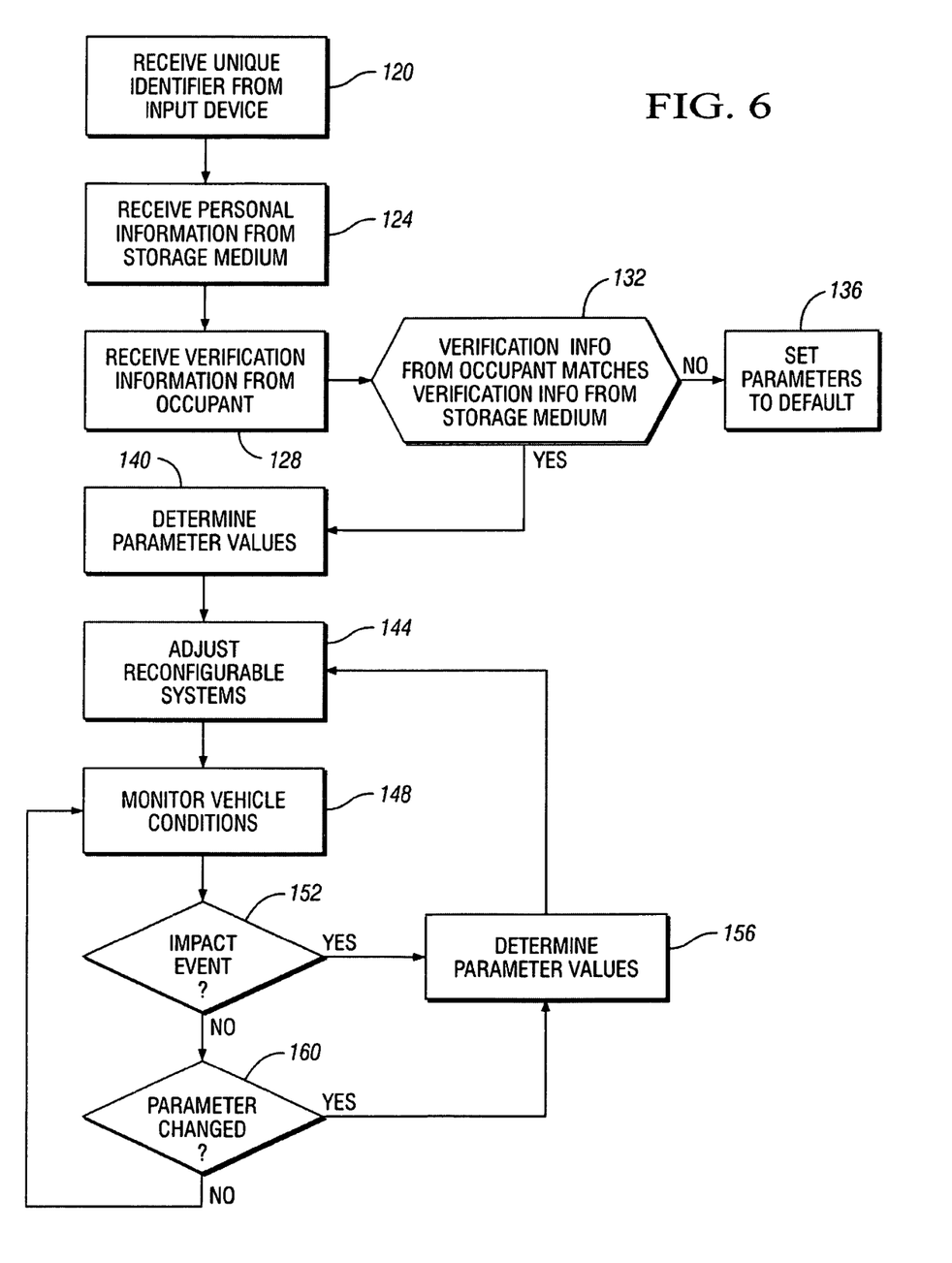
FIG. 6 is a flow chart depicting an exemplary operation of the personalization system.

FIG. 6 depicts a method of operation of the personalization system 12, and represents an exemplary control logic for the CPU 20. Referring to FIGS. 1 and 6, the user interface 14 includes a data input device 118 through which an occupant of the seat assembly communicates the occupant's identity to the CPU 20. In an exemplary embodiment, the input device 118 is a card reader configured to read the unique identifier stored in the magnetic strips 106A-D of the plastic cards 105A-D and to transmit the unique identifier to the CPU 20. At step 120, the CPU 20 receives the unique identifier of the occupant of the seat assembly 24 via the input device 118 of the user interface 14.

At step 124, the CPU 20 searches the module 16 for the data set corresponding to the unique identifier received at step 120, and retrieves the data set 92A-D corresponding to the unique identifier. Thus, if input device 118 reads personal identification medium 105A at step 120, then the CPU 20 retrieves data set 92A at step 124; if input device 118 reads personal identification medium 105B at step 120, then the CPU 20 retrieves data set 92B at step 124; if input device 118 reads personal identification mediums 105C at step 120, then the CPU 20 retrieves data set 92C at step 124; and if input device 118 reads personal identification medium 105D at step 120, then the CPU 20 retrieves data set 92D at step 124.

The CPU 20 confirms the identity of the occupant of the seat assembly 24 at steps 128 and 132. More specifically, the CPU 20 confirms that occupant of the seat assembly 24 is the person whose personal information is contained in the data set 92A-D retrieved at step 124. The user interface 14 includes a second input device 134 that receives verification information from the occupant of the seat assembly 24 and transmits the verification information from the occupant to the CPU 20 (step 128). If the verification information stored in the data sets 92A-D is a biometric identifier, then the input device 134 is a biometric sensor. The biometric sensor may, for example, be a camera, fingerprint reader, retinal scanner, microphone, etc. If the verification information is a personal identification number or alphanumeric password, then the input device 134, e.g., may be a keypad.

At inquiry 132, the CPU inquires whether the verification information received at step 128 matches the verification information stored in the data set retrieved at step 124. If the answer to the inquiry 132 is no, that is, if the verification information received at step 128 does not match the verification information stored in the data set retrieved at step 124, then the CPU performs step 136. At step 136, the CPU causes the adjustable parameters to assume predetermined default values. If the answer to the inquiry 132 is yes, then the CPU 20 proceeds to step 140.

At step 140, the CPU 20 uses the data set of the occupant retrieved at step 124 to determine values for the parameters of the reconfigurable vehicle systems 24, 44, 48, 52. More specially, the CPU 20 determines a value for each of the selectively variable parameters of systems 24, 44, 48, 52 based on the personal information contained in the data set retrieved at step 124 according to a predetermined impact simulation algorithm. In an exemplary embodiment, the impact simulation algorithm includes an occupant dynamics simulation model (impact simulation) and a design optimization analysis, both employing the personal information retrieved at step 124 to determine preferred values of the parameters of the systems 24, 44, 48, 52 for the occupant in real-time.

In an alternative method, computer simulations and design optimization analyses are performed off-line, e.g., during vehicle development process of the vehicle 10, and then the optimization results of the analyses are used to construct a response surface model. The response surface model can then be implemented in the impact simulation algorithm in the CPU 20.

At step 144, the CPU 20 causes the selectively variable parameters of systems 24, 44, 48, 52 to assume the values determined at step 140. The CPU 20 accomplishes step 144 by transmitting control signals to the reconfigurable systems (such as control signals to the actuators 80, 82, 84, 88). Accordingly, the system 12 retrieves and verifies biometric and personal preference information of individual occupants of a passenger vehicle and automatically reconfigures vehicle systems based on the retrieved and verified biometric and personal preference information.

At step 148, the CPU 20 monitors vehicle conditions via sensors. The sensors include the feedback sensors 81, 86, 90 of the reconfigurable systems 24, 44, 48, 52 and the vehicle conditions monitored include the selectively variable parameters. The vehicle 10 may also include a collision avoidance system 200 that includes sensors 204 and a controller 208. The sensors 204 monitor the vehicle environment and transmit signals 212 carrying sensor data describing vehicle environmental conditions to the controller 208. Exemplary conditions monitored by the sensors 204 include the proximity of exterior objects to the vehicle 10, the relative velocity of exterior objects with respect to the vehicle 10, etc. The controller 208 is programmed to analyze the sensor data from the signals 212 to determine if one or more predetermined vehicle conditions indicative of an elevated risk of vehicle collision exist. The controller 208 includes a data storage medium with stored data that the controller uses to determine the presence or absence of the one or more predetermined conditions based on the sensor data. Those skilled in the art will recognize that the stored data may be in a multitude of forms within the scope of the claimed invention, such as relational databases, look-up tables, formulae, etc.

Those skilled in the art will recognize a variety of collision avoidance system 200 configurations that may be employed within the scope of the claimed invention. For example, the sensors 204 may include radar sensors, video sensors, photoelectric sensors, ultrasonic sensors, etc. The collision avoidance system 200 may also include radar transmitters (not shown). The collision avoidance system 200 is operatively connected to the CPU 20 to communicate the level of risk of collision, and mode of collision, to the CPU 20. The vehicle 10 also includes impact sensors 216, which may include one or more accelerometers. The vehicle conditions monitored at step 148 include the conditions monitored by the collision avoidance system 200 and the impact sensors 216.

At inquiry 152, the CPU inquires whether the sensors 204, 216 indicate the presence of one or more predetermined conditions indicative of a vehicle impact. The predetermined conditions may be indicative of an elevated risk of impact, an anticipated impact, or an actual impact. If the answer to the inquiry 152 is yes, i.e., if the sensors 204, 216 indicate the presence of one or more predetermined conditions indicative of a vehicle impact, then the CPU proceeds to step 156. If the answer to the inquiry 152 is no, then the CPU 20 proceeds to inquiry 160.

At step 156, the CPU 20 determines new values for the selectively variable parameters according to the impact simulation algorithm, and based on the personal information retrieved at step 124 and the information from the sensors 204, 216 to take into account the impact mode and severity. Impact mode and severity may be continuously predicted by various algorithms; exemplary continuous collision severity and mode prediction algorithms are described in commonly assigned U.S. Pat. No. 6,816,766, issued Nov. 9, 2004 to Sala et al. After step 156, the controller proceeds to step 144 to cause the values of the parameters to assume the values determined at step 156.

Thus, CPU 20 is configured to continuously employ, in real time, the risk of collision information provided by the collision avoidance system, and the mode and severity information provided by the continuous collision severity prediction algorithm, in conjunction with the biometric data of the occupant of the seat assembly 24, to update the values of the parameters of the reconfigurable systems, such as the airbag systems 44 and the seat belt system 48. For example, the CPU 20 may employ different inflator outputs of the airbag 44 depending on whether the impact mode is frontal or rear.

At inquiry 160, the CPU inquires whether the feedback sensors 81, 86, 90 of the reconfigurable systems 24, 44, 48, 52 indicate an occupant-initiated change in the value of any of the selectively adjustable parameters. If the answer to the inquiry 160 is no, then the CPU 20 returns to step 148. If the answer to the inquiry 160 is yes, then the controller proceeds to step 156, and determines new values for the unchanged parameters based on the value of the changed parameters and the personal information retrieved at step 124 using the impact simulation algorithm.

Thus, CPU 20 continuously monitors the feedback sensors to determine if the occupant has changed any of the parameters. If so, the CPU 20 redetermines preferred values of the parameters of the other reconfigurable systems to compensate for the parameter altered by the occupant and readjusts the parameters of the other systems accordingly. For example, if the CPU 20 determines at step 160 that the occupant has raised the lower seat portion 32, then the CPU may determine a new height for the mount 72 of the webbing at step 156, and cause the actuator 80 to move the mount 72 to the new height at step 144. Similarly, if the CPU 20 determines at step 160 that the occupant has moved the lower seat portion 32 fore or aft, the CPU may determine a new inflator output for the airbag system 44 at step 156, and cause the actuator 88 to adjust to the new inflator output at step 144.

When information is not available for an occupant of the seating assembly 24, the parameters of the selective set of vehicle subsystems and features will be reset to manufacturer's default configurations.

Accordingly, the vehicle 10 is characterized by the ability to determine the identity of the occupant of the seat assembly 24, obtain biometric and other information about the occupant of the seat assembly 24, and use the biometric and other information about the occupant to reconfigure various systems according to an algorithm to optimize the system for the occupant. If another person becomes the occupant of the seat assembly 24, the vehicle 10 is characterized by the ability to reconfigure the systems for the new occupant.

It should be noted that the data storage and retrieval module 16 may be onboard the vehicle 10, or may be remotely located from the vehicle and accessed wirelessly such as by a telematics system (not shown). Exemplary data storage and retrieval modules include hard drives, read only memory, optical media, etc. In the embodiment in which the data storage and retrieval module 16 is offboard the vehicle, any vehicle having a compatible personalization system could access the data sets 92A-D and thereby be personalized by providing an occupant's unique identifier.

In an alternative embodiment, and within the scope of the claimed invention, each data set 92A-D may be stored on a respective one of the personal identification media (shown at 105A-D), thereby eliminating the data storage module 16. In such an embodiment, the data set 92A-D is retrieved by the controller 20 via the input device 118, and any vehicle having a compatible personalization system can be personalized for the person having their personal information on the personal identification medium.

Figure 7:
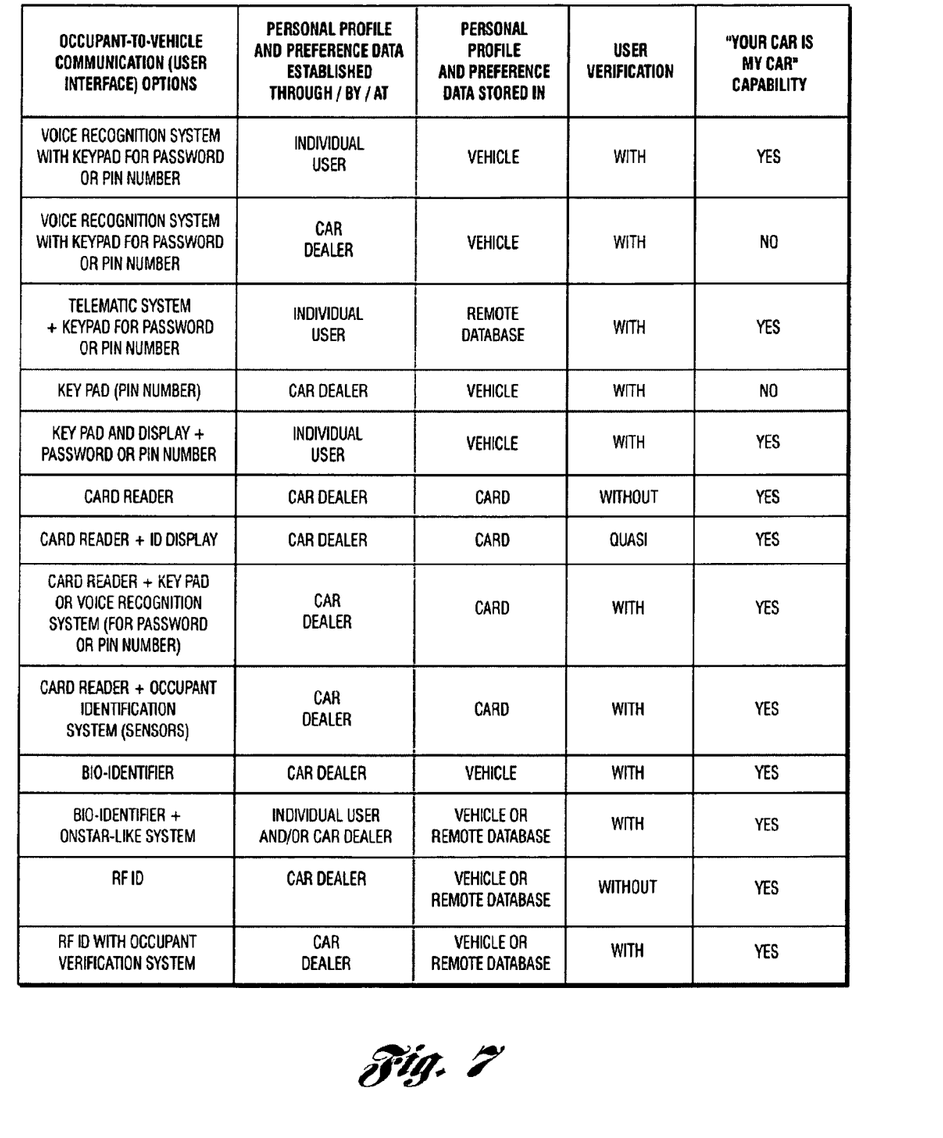
FIG. 7 is a table depicting exemplary input device and data storage configurations that may be used with the personalization system.

FIG. 7 depicts various exemplary user interface configurations. Referring to FIG. 7, the left column indicates input device types. Where two input device types are listed, one of the input device types may be used to receive unique identifiers and/or personal information, and the other input device type may be used to receive identifiers and/or personal information and for identity verification. The column second from the left indicates exemplary parties or locations at, through, or by which the personal information may be established. The column that is third from the left indicates exemplary locations for the storage of the personal information, e.g., a data storage medium onboard the vehicle, a data storage medium offboard the vehicle and accessed wirelessly, a portable medium carried by an occupant, such as a card, etc. The column that is second from the right indicates whether the user interface provides occupant verification, and the right column indicates whether the vehicle is receptive to personal information from a new user, such as by receiving personal information from a portable medium, from entry of the personal information through a keyboard or similar device, from a remote database, etc.

The vehicle 10 preferably includes a plurality of seating assemblies, each being occupiable by a separate occupant. The vehicle 10 also preferably includes a plurality of user interfaces 14, each being mounted with respect to the vehicle body 28 adjacent a respective one of the seating assemblies. The CPU 20 is programmed to optimize and adjust the values of parameters of reconfigurable systems for each of the seat assemblies based on the biometric information of the occupant of the seat assembly.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a seat assembly for supporting an occupant;
a reconfigurable system mounted with respect to the seat assembly and having a plurality of selectively variable parameters; and
a controller being
   operatively connected to said reconfigurable system to control the selectively variable parameters,
   configured to receive data indicative of personal information of the occupant from at least one data storage medium, wherein the occupant is a specific and identified person having personal information stored within the at least one data storage medium,
   configured to determine values of said selectively variable parameters according to a predetermined algorithm based on the data indicative of personal information of the specific and identified person,
   configured to cause said selectively variable parameters of the reconfigurable system to assume the determined values;
wherein the reconfigurable system is one of the seat assembly and a seat belt system; and
wherein said at least one data storage medium contains a plurality of data sets, each of said data sets containing data indicative of the personal information of one specific and identified person.

2. The vehicle of claim 1, further comprising a user interface operatively connected to the controller and being configured to retrieve the data indicative of personal information from said at least one data storage medium and to transmit the data to the controller.

3. The vehicle of claim 2, wherein the user interface is configured to retrieve the data from one of magnetic media, optical media, radiofrequency identification units, and programmable ROM.

4. The vehicle of claim 1, further comprising an input device being configured to transmit occupant identification data to the controller; and wherein the controller is configured to retrieve one of said data sets based on the occupant identification data.

5. The vehicle of claim 4, wherein the input device is configured to read the occupant identification data from a prerecorded medium.

6. The vehicle of claim 1, further comprising a biometric sensor configured to receive biometric information about the occupant and to transmit the biometric information to the controller; wherein the controller is configured to use the biometric information to confirm that the occupant is the specific and identified person having personal information stored in one of the selected data sets of the at least one storage medium.

7. The vehicle of claim 1, wherein the predetermined algorithm includes at least one of an impact simulation algorithm and an impact mode and severity algorithm.

8. The vehicle of claim 1, wherein the controller is configured to determine whether the occupant has altered the value of one of the variable parameters, and to redetermine the values of the other variable parameters based on the value of the altered parameter and the data indicative of personal information of the specific and identified person.

9. The vehicle of claim 1, wherein the data includes personal preferences; and wherein the controller is configured to determine values of said selectively variable parameters according to a predetermined algorithm based on the personal preferences.

10. A method of personalizing a vehicle having a reconfigurable system characterized by selectively variable parameters, the method comprising:
receiving data indicating personal information of a specific and identified person from a data storage medium containing a plurality of data sets, each of said data sets containing data indicative of the personal information of one specific and identified person;
determining values for said selectively variable parameters based on the data indicating personal information in accordance with a predetermined algorithm; and
causing said selectively variable parameters of the reconfigurable system to assume the determined values;
wherein the reconfigurable systems include one of a seat assembly and a seat belt system.

11. The method of claim 10, wherein the vehicle includes a seat assembly; wherein the method further comprises, subsequent to said causing said selectively variable parameters to assume the determined values, determining whether the value of one of said parameters has been changed by an occupant of the seat assembly; determining new values for said selectively variable parameters based on the value of the changed parameter and the data indicating personal information; and causing said selectively variable parameters to assume the new values.

12. The method of claim 10, further comprising determining vehicle impact mode and severity; determining new values for said selectively variable parameters based on the data indicating personal information and the impact mode and severity; and causing said selectively variable parameters to assume the new values.

13. The method of claim 10, wherein the vehicle includes a seat assembly; and wherein the method further comprises verifying that an occupant of the seat assembly is the specific and identified person having personal information stored in the at least one data storage medium.

14. The method of claim 13, wherein said verifying includes measuring a biometric identifier of the occupant and comparing the biometric identifier to the data indicative of personal information of the specific and identified person having information stored in the at least one data storage medium.

15. The method of claim 10, further comprising receiving data indicating personal preferences of the specific and identified person from a data storage medium; and wherein said determining values for said selectively variable parameters includes determining values for said selectively variable parameters based on the data indicating personal preferences in accordance with a predetermined algorithm.

* * * * *